US008933841B2

(12) United States Patent
Valaee et al.

(10) Patent No.: US 8,933,841 B2
(45) Date of Patent: Jan. 13, 2015

(54) SYSTEM AND METHOD FOR LOCALIZATION

(75) Inventors: Shahrokh Valaee, Toronto (CA); Chen Feng, Toronto (CA); Anthea Wain Sy Au, Markham (CA)

(73) Assignee: The Governing Council of the University of Toronto, Toronto, Ontario (CA)

( * ) Notice: Subject to any disclaimer, the term of this patent is extended or adjusted under 35 U.S.C. 154(b) by 375 days.

(21) Appl. No.: 12/966,493

(22) Filed: Dec. 13, 2010

(65) Prior Publication Data

US 2012/0149415 A1 Jun. 14, 2012

(51) Int. Cl.
*G01S 3/02* (2006.01)
*H04W 64/00* (2009.01)
*G01S 5/02* (2010.01)
*G01S 19/48* (2010.01)
*G01S 19/49* (2010.01)

(52) U.S. Cl.
CPC ............ *H04W 64/00* (2013.01); *G01S 5/0252* (2013.01)
USPC .................. 342/451; 342/357.31; 342/357.32

(58) Field of Classification Search
CPC ............................ G01S 5/0252; H04W 64/00
USPC .................. 342/451, 357.31, 357.32
See application file for complete search history.

(56) References Cited

U.S. PATENT DOCUMENTS

| 6,466,938 | B1* | 10/2002 | Goldberg | 1/1 |
|---|---|---|---|---|
| 7,202,816 | B2* | 4/2007 | Krumm et al. | 342/451 |
| 7,274,332 | B1* | 9/2007 | Dupray | 342/450 |
| 7,433,696 | B2* | 10/2008 | Dietrich et al. | 455/456.2 |
| 7,646,336 | B2* | 1/2010 | Tan et al. | 342/357.31 |
| 7,738,881 | B2* | 6/2010 | Krumm et al. | 455/456.1 |
| 2004/0053625 | A1* | 3/2004 | Bye | 455/456.1 |
| 2006/0089153 | A1* | 4/2006 | Sheynblat | 455/456.1 |
| 2008/0157970 | A1* | 7/2008 | Single et al. | 340/572.1 |
| 2008/0188237 | A1* | 8/2008 | Alles et al. | 455/456.1 |
| 2009/0082034 | A1* | 3/2009 | Gray et al. | 455/456.1 |
| 2009/0222200 | A1* | 9/2009 | Link et al. | 701/202 |
| 2010/0002777 | A1* | 1/2010 | Boyle et al. | 375/242 |
| 2010/0093368 | A1* | 4/2010 | Meyer et al. | 455/456.1 |
| 2010/0103048 | A1* | 4/2010 | Bamberger et al. | 342/451 |
| 2011/0279324 | A1* | 11/2011 | Bolotski et al. | 342/451 |

OTHER PUBLICATIONS

Frey et al., "Mixture Modeling by Affinity Propagaton", Machine Learning @ Toronto, Oct. 3, 2005.*
Hightower et al., "Particle Filters for Location Estimation in Ubiquitous Computing: A Case Study", UbiComp 2004, LNCS, vol. 3205, pp. 88-106, Heidelberg, 2004.*
Haug, "A Tutorial on Bayesian Estimation and Tracking Techniques Applicable to Nonlinear and Non-Gaussian Processes", Mitre Corporation, Jan. 2005, pp. 1-8.*

* cited by examiner

*Primary Examiner* — Frank J McGue

(74) *Attorney, Agent, or Firm* — Norton Rose Fulbright Canada LLP

(57) ABSTRACT

The present invention provides a system, method and computer program for anonymous localization. The location of a mobile device can be determined based on received signal strength (RSS) from one or more access points (APs) and a radio map. A radio map can be generated by measuring RSS at a set of fingerprints, which are a finite set of reference points within the area to be mapped.

27 Claims, 10 Drawing Sheets

SYSTEM AND METHOD FOR LOCALIZATION

FIELD OF THE INVENTION

The present invention relates generally to determining a location of a network connected mobile device. The present invention relates more specifically to determining the location of the network connected mobile device based on received signal strength and a radio map.

BACKGROUND OF THE INVENTION

Recent advances in smart phones have made it feasible to provide indoor Location-Based Services (LBSs) including through low cost Wireless Local Area Network (WLAN) infrastructures, such as indoor positioning, tracking, navigation, and location-based security. However, due to the complexity of the indoor environment, it is usually difficult to provide a satisfactory level of accuracy in most applications. Thus, one of the key challenges arises: how to design an accurate and real-time indoor positioning system that can be easily deployed on commercially available mobile devices without any hardware installation or modification.

Received Signal Strength (RSS)-based localization algorithms have been extensively studied as an inexpensive solution for indoor positioning in recent years. Compared with other measurement-based algorithms (e.g. time of arrival (TOA) or angle-of-arrival (AOA) measurements of ultra-wideband (UWB) signal), RSS can be easily obtained by a WiFi-integrated mobile device, without any additional hardware. Several RSS-based indoor positioning and tracking algorithms have been proposed based on the position information of access points (APs), which may result in labor overheads for the installation of infrastructures in real applications.

The key challenge for accurate RSS-based positioning comes from the variations of RSS due to the dynamic and unpredictable nature of radio channels, such as shadowing, multipath, interference, the orientation of wireless device, etc.

Also, as is well known GPS still does not provide optimal foundation for indoor LBSs because of signal outages, positional inaccuracies, and other technical problems prevent localization and tracing.

Certain mobile devices (such as those using the ANDROID™ operating system) are configured to enable the localization of the device but generally based on communication with a central server with which the mobile device checks in intermittently, providing current location information for the mobile device. Many users however are concerned about the privacy implications of their movements being traced by a remote computer. Furthermore, privacy breaches caused by dealings between individuals and web companies have become very public and have heightened concern around possible privacy implications of LBSs in particular. Certain information services, delivered to or using mobile devices may require some exposure of some location information associated with the user of the mobile device, however, this may be acceptable to the user if they were able to regulate this exposure, which prior art technologies do not permit.

Therefore, what is required is a system and method for localization of a mobile device and tracing of a mobile device, that provides effective support for LBSs including in indoor environments. There is a further need for a system and method for localization of a mobile device that enables LBSs, while maintaining privacy or enabling the user of the mobile device to control exposure of location information to remote computers.

SUMMARY OF THE INVENTION

The present invention provides a system for localization of a mobile device, the system comprising: (a) one or more network access points each emitting a signal; (b) a network accessible server; (c) a fingerprint database linked to the server, the fingerprint database providing a radio map based on received signal strength from the one or more network access points at one or more reference points; and (d) a mobile device, the mobile device linked to: (i) a network adaptor operable to receive the signal from the one or more access points; and (ii) a localization engine operable to obtain the radio map or a subset thereof from the server, and to determine the location of the mobile device based on the radio map and the received signal from the one or more access points.

The present invention also provides a method for localization of a mobile device, the method comprising: (a) providing a radio map based on received signal strength of one or more signals emitted from one or more network access points at one or more reference points; and (b) enabling a mobile device to: (i) receive, by means of a network adaptor linked to the mobile device, the signal from the one or more access points; (ii) obtain the radio map or a subset thereof; and (iii) determine, by means of a localization engine linked to the mobile device, the location of the mobile device based on the radio map and the received signal from the one or more access points.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

DESCRIPTION OF THE DRAWINGS

The invention will be better understood and objects of the invention will become apparent when consideration is given to the following detailed description thereof. Such description makes reference to the annexed drawings wherein.

Figure 1:
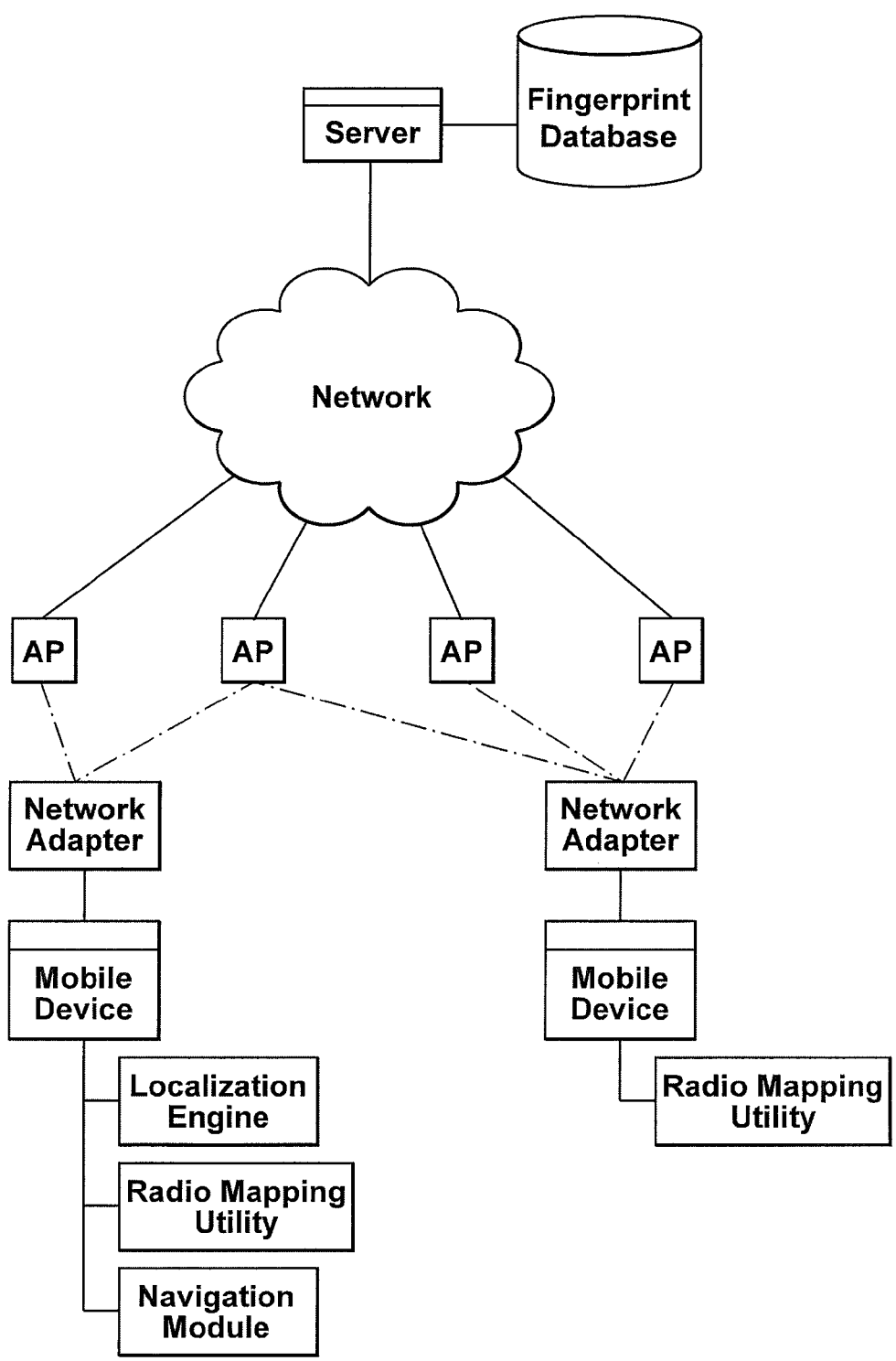
FIG. 1 illustrates a system in accordance with the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

The present invention provides a system, method and computer program for anonymous localization. The location of a mobile device can be determined based on received signal strength (RSS) from one or more access points (APs) and a radio map. A radio map can be generated by measuring RSS at a set of fingerprints, which are a finite set of reference points within the area to be mapped.

The present invention enables the mobile device to measure RSS and compare RSS to the radio map in order to determine its location without providing the RSS measurements to a server or other third party, thus enabling anonymous localization. Furthermore, the location of the APs does not need to be known in order to generate the radio map or determine the location of a mobile device.

The present invention comprises two phases: an offline phase for generating or reconstructing a radio map, and an online phase for localization. A radio mapping utility linked to a mobile device may implement the offline phase, while a localization engine linked to the mobile device may implement the online phase.

The radio mapping utility may generate the radio map by implementing a clustering technique, such as affinity propagation, followed by an outlier adjustment to address the effects of RSS variations. A compressive sensing algorithm may be used by the radio mapping utility to reconstruct the radio map based on RSS measurements at a subset of fingerprints, reducing the number of measurements significantly for updating the radio map.

The localization engine implements one or more algorithms to determine the location of the mobile device based on the measured RSS. One such algorithm is the k-nearest neighbor algorithm (kNN), which estimates the mobile device's location by computing the centroid of the k closest neighbors that have the smallest Euclidean distance with respect to the online RSS readings. Another algorithm is a statistical method, in which the probability of each potential position is analyzed using the Bayesian theory and kernel functions, assuming that RSS readings from different APs are independent at every time instant. A less computationally complex algorithm, which therefore enables real-time or near real-time performance, is a compressive sensing (CS) algorithm for recovering signals that are sparse or compressible under a certain basis, with far fewer noisy measurements than that needed by the Nyquist sampling theorem. The sparse signal can be reconstructed exactly with high probability by solving an l1-minimization problem. Due to the sparse nature of localization in the spatial domain, the CS algorithm, which offers exact deterministic recovery using a linear programming, is preferable.

In another aspect of the invention, the online phase is divided into two stages: (1) a coarse localization stage to reduce the region of interest; and (2) a fine localization stage to determine an accurate location. The use of two stage localization can significantly reduce processing requirements, thereby enabling real-time or near real-time localization of a mobile device. The localization engine preferably implements a cluster matching algorithm in the coarse localization stage and a compressive sensing algorithm in the fine localization stage.

Additionally, past position estimates and motion dynamics can be used in the coarse localization stage to more accurately reduce the region of interest. The motion dynamics can be modeled by a general Bayesian tracking model and a filter can then be derived to refine the position estimates. By assuming the Gaussian tracking noise model and linear motion dynamics, the general filter becomes a Kalman filter, whose optimal solution is a minimum mean square error (MMSE) estimate. Although the assumption of Gaussian RSS-position relationship is not often the case, the application of the Kalman filter as the post-processing step is able to improve the accuracy of the positioning systems. The accuracy of the estimate can be improved further by using a particle filter. This filter can be applied on non-Gaussian and non-linear models and it can also be refined by additional information such as map, accelerometers, etc. Therefore, in the coarse localization stage, the previous estimate may be used to select the nearby reference points, in addition to the clusters of reference points selected according to the online RSS readings. The tracking system may also implement the Kalman filter to smooth the estimate update.

The localization engine of the present invention is operable to provide relatively accurate location data associated with a mobile device, based on radio information derived from the mobile device only, without the need for information from a remote server tracking the location of the mobile device.

FIG. 1 illustrates a system in accordance with the present invention. The system may include one or more network access points (APs), a network accessible server for administering a fingerprint database, the fingerprint database linked to the server for providing a radio map, and one or more mobile devices, each linked to a network adaptor compatible with the protocol implemented by the APs so as to be operable to receive the signal from the one or more access points. For example, the APs may be IEEE 802.11 wireless access points and the network adaptors may be WLAN adaptors.

The network access points may have known or unknown location and may be associated with different networks. Each network access point emits a signal. The radio map is based on received signal strength from the one or more network access points at one or more reference points.

Each of the mobile devices may further include or be linked to a localization engine. The localization engine is operable to obtain the radio map or a subset thereof from the server, and to determine the location of the mobile device based on the radio map and the received signal from the one or more access points. The one or more mobile devices may also be linked to a navigation module for enabling a user of the mobile device to provide initial set up, and to provide the user with path routing and tracking updates. One or more of the mobile devices may further include or be linked to a radio mapping utility. Alternatively, certain mobile devices may be linked to a radio mapping utility and used for generating the radio map, while others may be linked to a localization engine and used by users, for example.

The one or more mobile devices will be referred to hereinafter as a single mobile device, linked to both the radio mapping utility and the localization engine, for simplicity.

The mobile device may continuously or intermittently collect online RSS readings from each AP (that is within radio range of the mobile device) at a time interval $\Delta t$, which may be limited or dependent on the mobile device's network adaptor and computing performance, denoted as $r(t)=[r_1(t), r_2(t), \ldots, r_L(t)]$, $t=0, 1, 2, \ldots$ and then computes the estimated positions, denoted as $\hat{p}(t)=[\hat{x}(t), \hat{y}(t)]^T$, where superscript T denotes transposition.

During the offline phase, the time samples of RSS readings are collected at the reference points, by pointing the mobile device to different orientations (e.g., north, south, east, west). The raw set of RSS time samples collected from AP i at reference point j with orientation o is denoted as $\{\psi_{i,j}^{(o)}(\tau), \tau=1, \ldots, q, q>1\}$, with q as the total number of time samples collected. Then, the average of these time samples may be computed and stored in a database, which is referred to as the radio map. The radio map gives a sufficient representation of the spatial RSS properties in the given region of interest, and can be represented by $\psi^{(o)}$:

$$\psi^{(o)} = \begin{bmatrix} \psi_{1,1}^{(o)} & \psi_{1,2}^{(o)} & \cdots & \psi_{1,N}^{(o)} \\ \psi_{2,1}^{(o)} & \psi_{2,2}^{(o)} & \cdots & \psi_{2,N}^{(o)} \\ \vdots & \vdots & \ddots & \vdots \\ \psi_{L,1}^{(o)} & \psi_{L,2}^{(o)} & \cdots & \psi_{L,N}^{(o)} \end{bmatrix} \quad (1)$$

where $$\psi_{i,j}^{(o)} = \frac{1}{q}\sum_{\tau=1}^{q} \psi_{i,j}^{(o)}(\tau)$$

is the average of RSS readings (in dBm scale) over time domain from AP i at reference point j with orientation o, for $i=1, 2, \ldots, L, j=1, 2, \ldots, N$, and $o \in O = \{0°, 90°, 180°, 270°\}$. L is the total number of APs that can be detected, and N is the number of reference points. The columns of $\psi^{(o)}$, radio map vectors, represent the RSS readings at each reference point with a particular orientation o, which can be referred to as $$\psi_j^{(o)}=[\psi_{1,j}^{(o)}, \psi_{2,j}^{(o)}, \ldots, \psi_{L,j}^{(o)}]^T, j=1, 2, \ldots, N \quad (2)$$

where the superscript T denotes transposition.

In addition, the variances of these time samples may be stored. The variance vector for each reference point is defined as $$\Delta_j^{(o)} = [\Delta_{1,j}^{(o)}, \Delta_{2,j}^{(o)}, \ldots, \Delta_{L,j}^{(o)}]^T, j=1, 2, \ldots, N \quad (3)$$

where $$\Delta_{i,j}^{(o)} = \frac{1}{q-1}\sum_{\tau=1}^{q}(\psi_{i,j}^{(o)}(\tau) - \psi_{i,j}^{(o)})^2$$

is the unbiased estimated variance of RSS readings from AP i at reference point j with orientation o.

The radio map is then the table $(x_j, y_j; \psi_j^{(o)}, \Delta_j^{(o)})$, $j=1, \ldots, N$, $o \in O$, where $(x_j, y_j)$ is the coordinates of the jth reference point. If no RSS reading is found for an AP at a reference point, the corresponding RSS entity in the radio map is set to a small value (in dBm scale) to imply its invalidity.

The reference points collected in the offline phase may be divided into a number of clusters. Since the database at different orientations has a different set of RSS readings, the clustering may be performed independently for each orientation. The affinity propagation algorithm may be used to generate the clusters, as it does not require initialization of exemplars in the traditional K-means clustering algorithm. Affinity propagation considers all reference points equally as potential exemplars by assigning the same real number, known as preference, for each reference point as an input. Then, real-valued messages are recursively transmitted between pairs of reference points based on a measure of similarity, until exemplars and corresponding clusters are generated. The pair-wise similarity $s(i, j)^{(o)}$ indicates how well the reference point j is suited to be the exemplar for reference point i, which is defined as $$s(i,j)^{(o)} = -\|\psi_i^{(o)} - \psi_j^{(o)}\|^2 \forall i, j \in \{1, 2, \ldots, N\}, j \neq i, o \in O \quad (4)$$

The self-similarity value $s(j, j)^{(o)}, j=1, 2, \ldots, N$, indicates the possibility that reference point j may become an exemplar. Since all the reference points are equally desirable to be exemplars, their preferences may be set to a common value. In order to generate a moderate number of clusters, the common preference for each orientation is defined as)

$$p^{(o)} = \gamma^{(o)} \cdot \text{median}\{s(i,j)^{(o)}, \forall i, j \in \{1, 2, \ldots, N\}, j \neq i\} \quad (5)$$

where $\gamma^{(o)}$ is a real number which is experimentally determined, such that a desired number of clusters is generated.

The core operation of the algorithm is the transmission of two kinds of real-valued messages between pairs of reference points. The responsibility message $r(i,j)^{(o)}$, sent from reference point to candidate exemplar reference point j, is given by $$r(i, j)^{(o)} = s(i, j)^{(o)} - \max_{j' \neq j}\{a(i, j')^{(o)} + s(i, j')^{(o)}\} \quad (6)$$

where $i \neq j$, and the availability message $a(i,j)^{(o)}$, sent from candidate exemplar reference point j to reference point i, is defined as $$a(i, j)^{(o)} = \min\left\{0, r(j, j)^{(o)} + \sum_{i' \neq i, j}\max\{0, r(i', j)^{(o)}\}\right\} \quad (7)$$

The messages may be passed recursively between pairs of reference points within each radio map and the above updating rules may be followed until a good set of exemplars and corresponding clusters emerges.

This process is conducted after the fingerprints are collected during the offline phase. For each radio map with a particular orientation o, let $H^{(o)}$ be the set of exemplars; and for each reference point $j \in H^{(o)}$, let $C_j^{(o)}$ denote the set of reference points for which reference point j is an exemplar. Each outlier, referred to as a reference point that is in the set of $C_j^{(o)}$ but physically far away from its exemplar j on the map, is further adjusted by assigning a new exemplar that is in its close proximity. Therefore, using the set of exemplars and their corresponding radio map vector, a coarse localization stage may be provided to select the clusters that match the online RSS observations, and then the reference points of these candidate clusters may be used to localize the mobile device during the fine localization stage.

Figure 2:
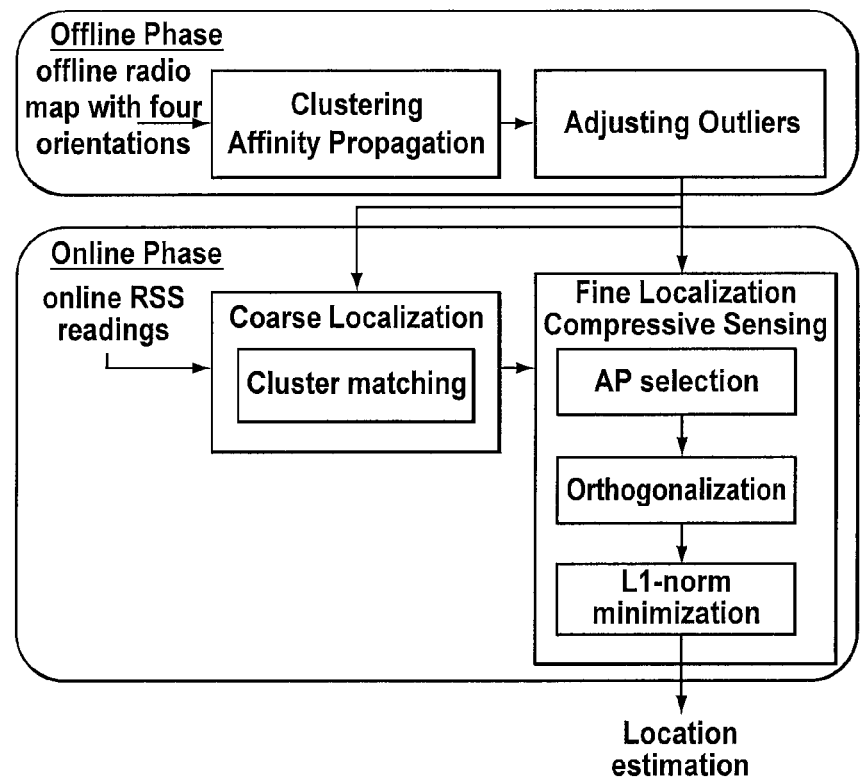
FIG. 2 illustrates a block diagram of the radio mapping utility and localization engine.

The actual localization of the mobile device takes place in the online phase. During the online phase, an RSS measurement vector, denoted as $$\psi_r = [\psi_{1,r}, \ldots, \psi_{L,r}]^T \quad (8)$$

where $\{\psi_{k,r}, k=1, \ldots, L\}$, is collected by the mobile device pointed to an arbitrary orientation at unknown location. As shown in FIG. 2, there may be two stages in the online phase, the coarse localization by cluster matching to reduce the area of interest; and the fine localization by using compressive sensing to recover the location estimation.

The goal of the coarse localization stage is to reduce the region of interest from the whole radio map to a subset thereof. Thus, it removes outliers, and reduces the complexity for the fine localization stage, as fewer reference points are considered. Furthermore, it confines the maximum localization error to the size of this subset, whereas this error can be much larger when no coarse localization is implemented.

The coarse localization is operated by comparing the similarity between the online RSS measurement vector and each exemplar to identify the cluster to which the online readings belong. Instead of selecting one cluster, a few best-matched exemplars S with their corresponding cluster member set C may be chosen to avoid the edge problem, which can lead to inaccurate estimation when the location of the mobile device is at the boundaries of clusters. Meanwhile, due to the time variation of the RSS, the online measurement can deviate from the values stored in the database.

Coarse localization can be implemented using a cluster matching scheme, such as exemplar-based cluster matching, average RSS-based cluster matching, weighted cluster matching or strongest APs for cluster matching to define the appropriate similarity function. Then the clusters with the largest similarity values may be selected as the candidate clusters.

In exemplar-based cluster matching, similar to (4), the similarity function is defined as the negative of Euclidean distance of the online measurement vector $\psi_r$ to the individual exemplar's RSS radio map vector.)

$$s(r,j)^{(o)} = -\|\psi_r - \psi_j^{(o)}\|^2, \forall j \in H^{(o)}, \forall o \in O \quad (9)$$

In average RSS-based cluster matching, instead of using the RSS radio map vector of each exemplar for cluster matching, the average of the RSS radio map vectors of all the cluster members is used to average out the possible RSS variations that come from a specific exemplar. It gives a more comprehensive and representative readings of the cluster. In this case, the Euclidean distance of the online measurement vector $\psi_r$ to the cluster with reference point j as its exemplar can be computed by $$s(r, j)^{(o)} = -\left\|\psi_r - \frac{1}{|C_j^{(o)}|} \sum_{k \in C_j^{(o)}} \psi_k^{(o)}\right\|^2, \quad (10)$$

$$\forall j \in H^{(o)}, \forall o \in O$$

where $|C_j^{(o)}|$ denotes the number of members in the cluster where reference point j is the exemplar.

In weighted cluster matching, since the variance of the RSS readings from each AP at each reference point is recorded during the offline phase, the stability of the RSS readings from a specific AP within a certain cluster can be considered as a weight for cluster matching. In weighted cluster matching, different weights are added to the above similarity function for each AP, so that stable RSS readings have larger weights. The corresponding similarity function is defined as $$s(r, j)^{(o)} = -\left\|\omega_j^{(o)} \otimes \left(\psi_r - \frac{1}{|C_j^{(o)}|} \sum_{k \in C_j^{(o)}} \psi_k^{(o)}\right)\right\|^2 \quad (11)$$

$$\forall j \in H^{(o)}, \forall o \in O$$

where $\hat{x}$ is the element-wise multiplication between two vectors. $\omega_j^{(o)} = [\omega_{1,j}^{(o)}, \ldots, \omega_{i,j}^{(o)}, \ldots, \omega_{L,j}^{(o)}]^T$, $l \in \{1, \ldots, L\}$, where $\omega_{l,j}^{(o)}$ represents the weight for the RSS reading from AP l in the cluster j with orientation o, which is proportional to the inverse of the corresponding RSS variance, namely, $$\omega_{l,j}^{(o)} \propto \frac{1}{\overline{\Delta}_{l,j}^{(o)}}, \text{ and } \overline{\Delta}_{l,j}^{(o)} = \frac{1}{|C_j^{(o)}|} \sum_{k \in C_j^{(o)}} \Delta_{l,k}^{(o)} \quad (12)$$

The weights are normalized, so that $\Sigma_{l=1}^{L} \omega_{l,j}^{(o)} = 1$.

In strongest APs for cluster matching, since the strongest APs provide the highest probability of the coverage over time, only the set of the APs with the highest online RSS readings is selected. Thus, in strongest APs for cluster matching, the similarity is calculated using any of the above schemes by only considering these selected APs.

All the above cluster matching schemes attempt to reduce the possibility of choosing the wrong cluster, which is the main source for the maximum localization error.

The best-matched clusters can be found by using one or more of the above schemes. By evaluating the similarity function described above, the set of best-matched exemplars S with their corresponding cluster member set C can be found as $$S = \{(j, o) : s(r, j)^{(o)} > \alpha, j \in H^{(o)}, \forall o \in O\} \quad (13)$$

$$C = \bigcup_{(j,o) \in S} C_j^{(o)} \quad (14)$$

where $\alpha$ is a pre-defined threshold to obtain a moderate number of clusters in S. Since only a small number of clusters is desired to be included in S, $\alpha$ may be set to be a percentage of the maximum similarity, that is $$\alpha = \alpha_1 \cdot \max_{j \in H^{(o)}, \forall o \in O} \{s(r, j)^{(o)}\} + \alpha_2 \cdot \min_{j \in H^{(o)}, \forall o \in O} \{s(r, j)^{(o)}\} \quad (15)$$

where $\alpha_1 + \alpha_2 = 1$, and $\alpha_1 = 0.95$ are possible examples of such settings.

After the coarse localization, the set of interest can be reduced to the set C. The partial radio map matrix $\tilde{\psi}_{L \times \tilde{N}}$, with $\tilde{N} = |C|$ can be obtained by $$\tilde{\psi} = [\psi_j^{(o)} : \forall (j,o) \in C] \quad (16)$$

The matrix $\tilde{\psi}$ will be used by the following fine localization stage. Note that it is possible that more than two columns in $\tilde{\psi}$ represent the same reference point, but with different orientations, as all clusters from different orientations are considered for the cluster matching.

The localization problem has a sparse nature, as the position of the mobile device is unique in the discrete spatial domain at a certain time. Ideally, assuming that the mobile device is located exactly at one of the reference points pointing at one of the orientations, the device's location can be formulated as a 1-sparse vector, denoted as θ (this assumption can be relaxed). Thus, θ is a $\tilde{N} \times 1$ vector with all elements equal to zero except $\theta(n)=1$, where n is the index of the reference point at which the mobile device is located, namely $$\theta=[0,\ldots,0,1,0,\ldots,0]^T.\quad(17)$$

Then, the online RSS reading measured by the mobile device can be expressed as $$y=\Phi\tilde{\psi}\theta+\epsilon\quad(18)$$

where $\tilde{\psi}$ is the partial radio map matrix as defined in (16), and $\epsilon$ is an unknown measurement noise that comes from RSS deviations. The M×L matrix Φ is an AP selection operator applied on the online RSS measurement vector $\psi_r$, such that $$y=\Phi\psi_r.\quad(19)$$

Due to the wide deployment of APs, the total number of detectable APs is generally much greater than that required for positioning, which leads to redundant computations. Furthermore, unreliable APs with large RSS variances may also lead to biased estimation and affect the stability of the positioning system. This motivates the use of AP selection techniques to select a subset of available APs for positioning. Different AP selection schemes can be used to increase the accuracy of the fine localization stage.

According to (1), the set of APs covering the reference points can be denoted as L, with |L|=L. The objective of AP selection is to determine a set $M \subseteq L$ such that |M|=M≤L. This process is carried out by using the AP selection matrix Φ. Each row of Φ is a 1×L vector with all elements equal to zero except $\phi(l)=1$, where l is the index of the AP that is selected for positioning:

$$\phi_m=[0,\ldots,0,1,0,\ldots,0], \forall m\in\{1,2,\ldots,M\}\quad(20)$$

Different approaches can be used to determine the matrix Φ, including strongest APs, Fisher criterion and random combination.

In strongest APs, similar to the coarse localization, the set of APs with the highest RSS readings is selected, arguing that the strongest APs provide the highest probability of the coverage over time. Here, the measurement vector (8) is sorted in the decreasing order of RSS readings, and the APs corresponding to the least indices are used. Since Φ is created based on the current online measurement vector, this criterion may create different Φ for each location update.

The Fisher criterion is used to quantify the discrimination ability for each AP across reference points over four orientations. By comparing the metric $\xi_i, \forall i \in \{1,\ldots,L\}$, defined as $$\xi_i = \frac{\sum_{(j,o)\in C}(\psi_{i,j}^{(o)}-\bar{\psi}_i)^2}{\sum_{(j,o)\in C}(\Delta_{i,j}^{(o)})}\text{ where }\quad(21)$$

$$\bar{\psi}_i = \frac{1}{\tilde{N}}\sum_{(j,o)\in C}\psi_{i,j}^{(o)}.$$

The denominator of $\xi_i$ ensures that RSS values do not vary much over time so that the offline and online values are similar; while the numerator represents the discrimination ability of each AP by evaluating the strength of variations of mean RSS across reference points. The APs with the highest, are selected to construct the matrix (I) for the fine localization.

In a random combination, unlike the above two schemes, which select the appropriate APs based on different criteria and create the matrix Φ dynamically for each location update, the AP selection operator Φ is defined as a random M×L matrix with i.i.d Gaussian entries. The random combination scheme has less computational complexity, as the matrix is fixed at different runs, and it does not require as much RSS time samples to calculate the variance as required by the Fisher criterion.

Besides sparsity in (18), incoherence is another important property that should be satisfied to enable the use of the CS theory. However, Φ (generated by either the strongest APs or the Fisher criterion) and $\tilde{\psi}$ are in general coherent in the spatial domain, which violates the incoherence requirement for the CS theory. The following orthogonalization pre-processing procedure restores such property.

Define an orthogonalization operator T as $$T=QR^\dagger\quad(22)$$

where $R=\Phi\tilde{\psi}$, and $Q=\text{orth}(R^T)^T$, where orth(R) is an orthogonal basis for the range of R, and $R^\dagger$ is a pseudo-inverse of matrix R.

The orthogonalization process is done by applying the operator T on the measurement vector y, such that $$z=Ty=QR^\dagger R\theta+\epsilon'\quad(23)$$

where $\epsilon'=T\epsilon$. It is straightforward to show that $QR^\dagger R=Q$. Therefore, the localization problem formulated in (18) can be reformulated as $$z=Q\theta+\epsilon'.\quad(24)$$

Here Q is a row orthogonal matrix with unit norm. It has been proved that Q obeys the Restricted Isometry Property (RIP) that is needed by the CS. Since θ has a sparse nature, according to the theory of compressive sensing, if the number of APs M is in the order of log($\tilde{N}$), the location indicator θ can be well recovered from z with very high probability, by solving the following $l_1$-minimization problem.

$$\hat{\theta}=\underset{\theta\in R^{\tilde{N}}}{\operatorname{argmin}}\|\theta\|_1, \text{ s.t.}, z=Q\theta+\epsilon'.\quad(25)$$

where $\|\bullet\|_1$ is the $l_1$-norm of a vector.

On a special note, the complexity of the $l_1$-minimization algorithm grows proportional to the dimension of vector θ, which represents the number of potential reference points. Therefore, the coarse localization stage, which reduces the area of interest from all the N reference points into a subset of $\tilde{N}$ reference points ($\tilde{N}\ll N$), reduces the computational time for solving the $l_1$-minimization problem and thus, allows this procedure to be carried out by resource-limited mobile devices.

If the mobile device is located at one of the reference points pointing at one of the measured orientations, the recovered position is almost exact. However, in a real scenario, the mobile device may not be exactly located at a certain reference point facing a certain orientation. In such cases, the recovered location $\hat{\theta}$ is not an exact 1-sparse vector, but with a few non-zero coefficients. In order to compensate for the error induced by the grid assumption, a post-processing procedure is conducted. It is preferable to choose the dominant coefficients in $\hat{\theta}$ whose values are above a certain threshold λ, and take the normalized value in $\hat{\theta}$ as the corresponding weight for each potential reference point to calculate the location estimation. Let R be the set of all indices of the elements of $\hat{\theta}$ such that $$R=\{n|\hat{\theta}(n)>\lambda\}. \tag{26}$$

The location of the mobile user can be estimated by a weighted linear combination of these candidate points, which is $$(\hat{x}, \hat{y}) = \frac{1}{\sum_{n\in R}\hat{\theta}(n)} \sum_{n\in R} \hat{\theta}(n)\cdot(x_n, y_n). \tag{27}$$

The radio map may need to be updated if the surrounding environment changes significantly. Specifically, let vector $r_i$ represent the RSS readings from AP i over the reference points that cover the experimental area, which is also the transpose of the ith row of the RSS radio map database defined in (1). Let F denote the linear operator that transforms the $r_i$ from the pixel representation in the spatial domain into the sparse representation in the frequency domain, namely, $$x=F\cdot r_i \tag{28}$$

Further define a sampling matrix $G_{M\times N}$. Each row of G is a $1\times N$ vector with all elements equal to zero except $g(n)=1$ where n is the index of the reference point that is measured on the radio map by the mobile device during the offline phase. The measured reference points are randomly selected.

Therefore, the offline RSS vector from a certain AP measured by the mobile device can be expressed as:

$$m=Gr_{i=GF}^{-1}x=Rx \tag{29}$$

Since x has a sparse feature, with the similar orthogonalization procedure in (23), namely, z=Tm, the radio map can be reconstructed by solving the following $l_1$-minimization problem. Here, total variation minimization, a special case of the $l_1$-minimization, can be used to solve the sparse signal recovery problem, as it is widely used for 2D image recovery.

$$\hat{x} = \underset{x}{\operatorname{argmin}} \|\nabla(x)\|_1, \text{ s.t., } z = Qx + \varepsilon \tag{30}$$

where $\|\nabla(x)\|_1$, defined as the total variation of x, is the sum of the magnitudes of the gradient at every point, and $\epsilon$ is the measurement noise.

Finally, the reconstructed RSS radio map from AP i over the area of interest can be obtained by $$r_i = F^{-1}x \tag{31}$$

The radio map from the rest of the APs can be recovered using the same approach. Therefore, RSS is measured on a small number of grid points and (30) is used to reconstruct the radio map on the whole grid. Since the number of measurements (M) needed for the radio map recovery obeys O(k log(N)), where N is the total number of reference points, and k indicates the sparsity level of signal x, significant reduction in the number of measured reference points can be expected.

The CS-based positioning system can be extended as a tracking system, which improves the accuracy in estimating the mobile device's locations. By using the mobile device's previous estimated locations, the tracking system is able to refine the current estimate in two ways: 1) to select appropriate reference points in the coarse localization stage and 2) to apply Kalman filter for better location estimate. Map information is used to determine how the Kalman filter is updated to find the location. A modified coarse localization stage chooses the relevant reference points based on two criteria: (1) online RSS readings; and (2) physical proximity of previous estimate.

The localization engine first selects the clusters of reference points defined in the offline stage that have similar RSS reading patterns to the online RSS vector r(t). This cluster matching process is as previously described. The localization engine then compares the online RSS readings to the averaged RSS readings of the reference points from the same cluster to select the best-matched clusters of reference points, which are denoted as a set $C_{RSS}$.

Besides the use of the online RSS readings to choose the relevant reference points, reference points can be chosen by finding the possible range of the device's current location based on the previous estimated location, $\hat{p}(t-1)=[\hat{x}(t-1), \hat{y}(t-1)]^T$. Since a person cannot walk far away within a short period of time, it is reasonable that the system limit the region of interest into a range of possible walking range from the previous estimated position, if it is known and reliable. There are two schemes to choose this possible walking range, unpredicted scheme and predicted scheme.

The unpredicted scheme selects the reference points which are within walking distance during the specified update time interval to the previous estimated location, that is $$C_{Dist}=\{j|\sqrt{(x_j-\hat{x}(t-1))^2+(y_j-\hat{y}(t-1))^2}<\beta, j\in 1,\ldots,N\} \tag{32}$$

where $\beta$ is the walking distance within the specified update time interval $\Delta t$.

The predicted scheme uses the previous estimated location to predict the current possible location based on a linear motion model and then chooses the reference points which are within the walking range of this predicted position. The state vector of this linear model contains the position and velocity of the mobile device, i.e. $\hat{x}(t)=[\hat{x}(t), \hat{y}(t), v_x(t), v_y(t)]^T$ with $v_x(t)$ and $v_y(t)$ as the velocities in x and y direction at time t respectively. Then, the model is defined as $$\hat{x}(t) = F\hat{x}(t-1) \tag{33}$$

$$z(t) = H\hat{x}(t) \tag{34}$$

$$F\begin{pmatrix}1 & 0 & \Delta t & 0\\ 0 & 1 & 0 & \Delta t\\ 0 & 0 & 1 & 0\\ 0 & 0 & 0 & 1\end{pmatrix}, H = \begin{pmatrix}1 & 0 & 0 & 0\\ 0 & 1 & 0 & 0\end{pmatrix} \tag{35}$$

where z(t) is the predicted current location. The estimation of the unknown velocities, $v_x(t)$ and $v_y(t)$ can be obtained from the output of the Kalman filter based on the same linear model (33) in addition to Gaussian noises, which is implemented after the fine localization stage. The implementation of the Kalman filter is described above.

The localization engine then selects a set of reference points, $C_{Dist}$, which are in close proximity to the predicted current location, z(t), according to (32), where z(t) is used instead of $\hat{p}(t-1)$.

After the selection of these two groups of relevant reference points based on RSS readings similarities and physical proximities, the localization engine includes the common reference points that appear in both groups as the set of reduced region, where the final localization stage is then applied. The common reference points are obtained as a set C, $$C=C_{RSS}\cap\{(j,o)|j\in C_{Dist} \text{ and } o\in O\} \tag{36}$$

This set contains reference points that satisfy both conditions of similar RSS readings to the online RSS measurement and within close range to the mobile device's previous location. Thus, they are very likely to be the possible locations at which the mobile device is located. By introducing the constraint of physical range, the localization engine is able to identify the instant when the online RSS readings collected is not useful to find the mobile device's position. In normal operation, the mobile device must be within a range around its previous location. If the selected clusters of reference points in $C_{RSS}$ are far away from the previous location, then the online RSS readings can be regarded as invalid, as there are large deviations between the online readings and offline database, so that the cluster matching based on similarities of RSS readings fails to find the correct clusters of reference points. This scenario leads to an empty set of C and halts the fine localization stage. If such thing occurs, the localization engine discards this online RSS measurement vector and obtains a new one to restart the localization process.

There may be a possibility that all the consecutive online RSS measurement vectors lead to empty sets of C. This makes the localization engine continuously collect a new online RSS measurement, which is then discarded, preventing it from computing the true estimate of the mobile device's location. This happens as the previous position estimate is not accurate and hence the selection of reference points based on such estimate does not match with the reference points selected based on the online RSS measurement vector. Thus, the localization engine only uses the online RSS measurement vector to select the reference points, when $N_{empty}$ consecutive online RSS measurement vectors are discarded, arguing that the previous position estimate is no longer valid to reduce the localization problem into a smaller relevant region.

A Kalman Filter is applied on the location estimate computed in the fine localization stage to enhance the tracking performance. By adding Gaussian noises to the linear motion models as described in (37), the Kalman tracking model is formulated as $$x(t)=Fx(t-1)+\omega(t) \quad (37)$$

$$z(t)=Hx(t)+v(t) \quad (38)$$

The process noise $\omega(t) \sim N(0,P)$ and the measurement noise $v(t) \sim N(0,U)$ are assumed to be independent with the corresponding covariance matrices P and U.

The steps to obtain the final estimates of state vector $\hat{x}(t)$ and the error covariance P(t) include prediction and update.

In prediction, $$\hat{x}^-(t)=F\hat{x}(t-1) \quad (39)$$

$$P^-(t)=FP(t-1)F^T+Q \quad (40)$$

In update, $$K(t)=P^-(t)H^T(HP^-(t)H^T+R)^{-1} \quad (41)$$

$$\hat{x}(t)=\hat{x}^-(t)+K(t)(z(t)-H\hat{x}^-(t)) \quad (42)$$

$$P(t)=(I-K(t)H)P^-(t) \quad (43)$$

Note that the observation z(t) in (42) is the estimation of position computed by the fine localization stage, i.e. $z(t)=\tilde{p}(t)$. After the computation of the state vector, the final estimate of the mobile device's location can be found as $\hat{p}(t)=H\hat{x}(t)=$ In a real situation, the Kalman filter is able to enhance the tracking performance when the user with a mobile device is walking along a corridor inside a building, as the linear motion assumed by the filter is sufficient to model the user's trajectory. However, when user is making a turn at an intersection, the linear model does not apply on this behavior which involves abrupt change in direction and hence the Kalman filter requires several more updates to reflect the user's true trajectory and thus leads to more errors in position estimate.

By using the map information, the Kalman filter can be modified to follow the user's trajectory more closely. Since the Kalman filter behaves the best when the user is walking straight along a corridor but performs poorly around the intersections, the Kalman filter is reset when the user is in the region of intersection. According to the map, a region of intersection i can be identified as a non-rotated bounding box with $(x_{min}^i, y_{min}^i)$ and $(x_{max}^i, y_{max}^i)$ as the lower-left and upper-right corners respectively. Thus, the user is within the intersection region at time $t_{turn}$ if the below two conditions are satisfied:

$$x_{min}^i \leq \hat{x}(t_{turn}) \leq x_{max}^i, y_{min}^i \leq \hat{y}(t_{turn}) \leq y_{max}^i \quad (44)$$

Then, the Kalman filter is reset by reassigning the initial condition of Kalman filter $x(t_{turn})=[\hat{p}(t_{turn}),0,0]^T$ and $P(t_{turn})=P(0)$ and the Kalman filter is updated as normal according to (39) to (43) for the next estimate using $z(t_{turn}+1)=\tilde{p}(t_{turn}+1)$ This removes the inaccurate estimation by Kalman filter when the user is making a turn.

The mobile device may further be linked to a navigation module to provide guidance to the mobile user to reach his desired destination. The navigation module may enable: 1) initial setup, 2) path routing and 3) tracking update.

The navigation module depends on the map of the region of interest, which shows the layout of different features such as rooms, corridors and elevators etc. During the setup stage, information about different map features are extracted from the map, in order to let the navigation system to generate a feasible path and descriptive instructions about the surrounding environment.

First, the layout of the map may be interpreted as a graph with nodes, which are a set of Cartesian coordinates of the possible passage points along the corridors or destinations and edges between nodes that means they can reach each other physically. Each edge may be assigned with a non-negative weight, which is defined as the Euclidean distance between two connected nodes. This connected graph is used by the system to generate the desired path for path routing. In addition to the definition of this connected graph, a list of map features is recorded along with their locations, so that the navigation system can generate instructions based on these features.

At the beginning of the navigation, the mobile device first obtains the user's input of desired destination and user's current location, which can be either specified by the user or estimated by the device using the localization engine. Then, the system identifies the two nodes on the connected graph, predefined during initial setup, that are closest to the destination and user's current location, respectively. Path routing may be interpreted as finding the shortest path between these two nodes on the connected graph. This problem can be solved by applying the Dijkstra algorithm.

The generated path can be divided into series of line segments that are oriented at different directions. The generated path can be denoted as a set of line segments $G=\{l_1, l_2, \ldots, l_S\}$, where S is the number of line segments and each segment is denoted as $l_i=\{p_S^i, p_e^i\}$, where $p_S^i=\{x_S^i, y_S^i\}$ and $p_e^i=\{x_e^i, y_e^i\}$ are the starting and ending points of the ith line segment respectively. The turning points are identified as the ending points between line segments, that is $T=\{p_e^i | i=1, \ldots, S-1\}$. Based on these generated line segments, the system is able to determine the turning points, the direction of turns and the distance traveled at each line segments. In addition, the system can also find out the list of relevant map features appeared along this generated path denoted as $F=\{p_f^j,\ Feature_j|j=1,\ldots,C\}$, where $p_f^j=\{x_f^j,y_f^j\}$ is the location of feature j and $Feature_j$ is the feature's name and C is the total number of relevant map features.

Figure 3:
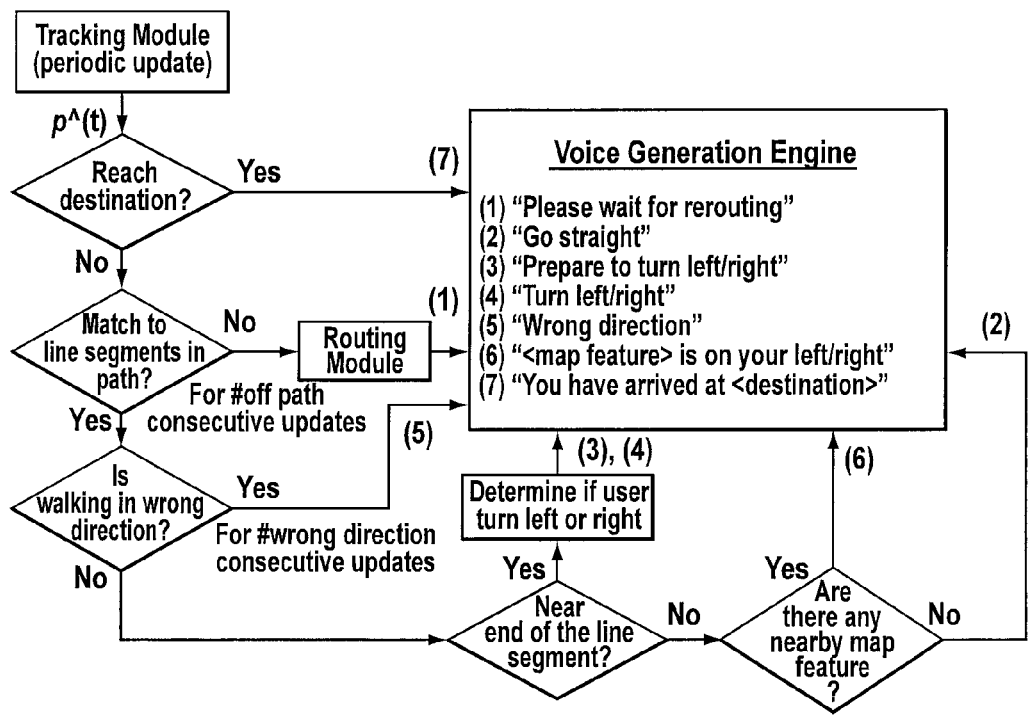
FIG. 3 illustrates tracking update analysis.

After the generation of the path that can lead the user to his targets, the navigation module begins tracking updates to keep track of user's position. For each tracking update, the navigation module compares the location estimate to the routed path to check if the user follows the path properly. The analysis is done according to FIG. 3.

Figure 4:
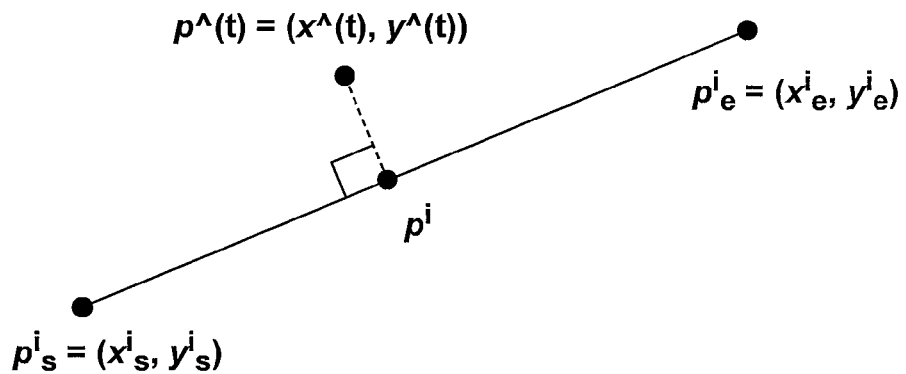
FIG. 4 illustrates a point in close range to a line segment.

The navigation module first determines if the user reaches the destination by checking the Euclidean distance between the user's current position and the target being within a range, $\beta_{destination}$. Otherwise, the navigation module attempts to match the user's current position $\hat{p}(t)$ to one of the line segments in the generated path set G. If this tracking update is within a line segment, $l_i$ as illustrated in FIG. 4, then the navigation module can find the projection and the minimum distance of the tracking update point $\hat{p}(t)$ to the line segment $l_i$ with $p_s^i$ and $p_e^i$ by solving the two equations:

$$p^i = p_s^i + \mu_i(p_e^i - p_s^i) \tag{45}$$

$$(\hat{p}(t)-p^i)(p_e^i-p_s^i)=0 \tag{46}$$

where $p^i$ is the projected point which is collinear and $p_s^i$ and $p_e^i$ and $\mu$ is the ratio in terms of the distance between $p_s^i$ and $p_e^i$ indicating how far the point $p^i$ is away from $p_s^i$. The solution to $\mu_i$ from (45) is $$\mu_i = \frac{(\hat{p}(t) - p_s^i)(p_e^i - p_s^i)}{\|p_s^i - p_e^i\|^2} \tag{47}$$

If the computed $\mu_i$ is within a range of [0, 1], then the projected point falls onto the line segment, which means the update estimate is within the range of this line segment. By substituting (47) into (45), the projected point p can be computed and the shortest distance of the tracking update point to the line segment can be obtained as $d_{min}^i = \|\hat{p}(t)-p^i\|$. Hence, the navigation module determines that the tracking estimate matches the line segment $l_i$ if i) $\mu_i \in [0,1]$ [0, 1] and ii) $d_{min}^i < \beta_{path}$. If there are consecutively $N_{offpath}$ tracking estimates failing to match with any of the line segments in G, then the navigation module can prompt the user to stop moving and do the path rerouting following the same procedure described above using user's current position as the starting point.

In addition, if the value of $\mu$ is close to one, which means the user is close to the end of the line segment, then the navigation module can identify that the user is required to turn and give appropriate instructions. Note that, in normal situation, where the user follows the path correctly, the value of $\mu$ should increase along the same line segment for each update and eventually move to the next segment. The direction of turn can then be computed based on the current and next line segments' directions.

To determine the orientation of the mobile user, for each tracking update, a direction vector is computed between the current update and the previous one and then is compared with the currently matched line segment direction. If consecutive $N_{Wrong\ direction}$ tracking updates are in opposite direction of the line segment, then a voice command of wrong direction may be issued to the user.

Finally, the navigation module computes the Euclidean distance between the user's current estimate $\hat{p}(t)$ to the map features in F. If the distance is smaller than $\beta_f$, then the module will generate the corresponding voice command regarding this specific map features to the user.

The present invention can be applied to a plurality of indoor and outdoor applications.

For example, the present invention can be used to augment current location-based services that are operable outdoors (for example, by use of GPS) but lose functionality indoors. Augmenting outdoor location-based services could be advantageous by providing users the ability to receive path routing within a building from an external origin. It could further be used to enhance emergency services by providing precise locations of emergency situations. Advertisers could also extend advertising to a more precise location to enhance behavioral marketing.

Another application of the present invention is to enable data sharing between mobile devices within close proximity. Potential applications include file (photos and other media) sharing, document exchange and dating.

Further applications include enabling precise localization of a user within a blueprint provided by the radio map. For example, a user could use a mobile device to navigate a shopping mall that has a radio map augmented with location information including store locations, department locations within a store, sections with a department, and even product placement within a section. Conversely, the invention could be used to monitor/track the location of a child or adult in a busy mall setting.

Similarly, the invention could be used to: index and remember the location of parking a user's car in an indoor parking garage; locate services (bathrooms, restaurants, boarding gates, etc.) in an airport, conference center, theme park, hotel or other large or unfamiliar facility; and track locations of assets by placing a fingerprint at the asset location. Asset location tracking could be beneficial, for example, for enabling delivery companies to quickly and precisely locate a delivery point.

The invention could further be used as input to a mobile utility that is location based. For example, in an indoor location that has contextual feedback at a given location, the invention could provide the prompt necessary for the feedback to be provided to a user. In a specific example, a user could be in a museum that has a mobile application providing information regarding the museum artifacts. When the user is in the vicinity of an artifact, the corresponding information can be automatically provided to the user. This could also be used at a site auction, for example, where information on the sale items could be presented to users based on the user being in proximity of the sale items. It could also be used in real estate sales, where owners could set up information to be presented for specific portions (e.g., rooms, views, etc.) of the real estate.

EXPERIMENT #1

Real data were obtained from an office building. Specifically, the experiments were carried out on a 30 m×46 m area of the fourth floor of an eight-story building (Bahen Center at the University of Toronto). A total of 26 APs were detected throughout the area of interest. A PDA (HP iPAQ hx4700 with Windows Mobile 2003 pocket PC) was used to measure WLAN signal strength value, and a software was developed in Visual Studio C# to implement the CS-based positioning system on the device. The RSS values were collected on the device by using the open source library OpenNetCF, which provides access to MAC address and RSS values of WLAN APs. During the offline phase, the RSS observations from 26

APs were recorded for a period of 50 seconds (one sample per second) over 72 reference points with an average grid spacing of 1.5 m. At each reference point, RSS values from four orientations were recorded. The online observations were collected on a different day by the device at unknown locations as the testing points to evaluate the actual performance of the system under time-varying environment. Each online observation is an average of 2 RSS time samples, which takes 2 seconds for Wi-Fi scanning on the device.

In the following, the localization error, which is measured by averaging the Euclidean distance between the estimated locations of the mobile user and the actual location over the testing points, has been reported as the performance measure.

Figure 5:
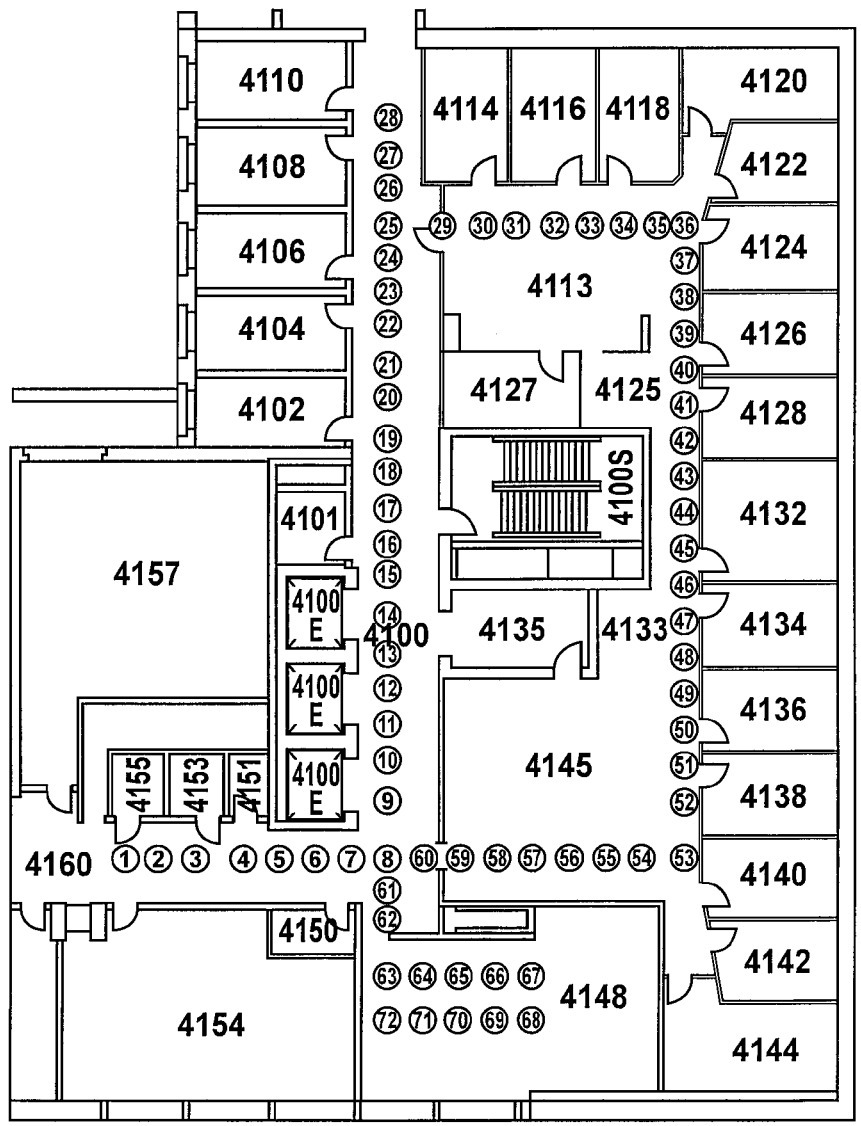
FIG. 5 illustrates an example of the clustering result on a PDA using affinity propagation on the radio map at the north orientation.

In order to mitigate the RSS variations and to remove potential outliers for coarse localization, affinity propagation is applied on each radio map to generate clusters and their corresponding exemplars during the offline phase. FIG. 5 shows an example of the clustering result on the PDA for the radio map at the north orientation. Each point represents one reference point at which RSS readings are collected, and each color represents one cluster. It shows that the 72 reference points are divided into 13 clusters, and most of reference points belonging to the same cluster are geographically close to each other. We note that the number of clusters might be different at different orientations.

Figure 6:
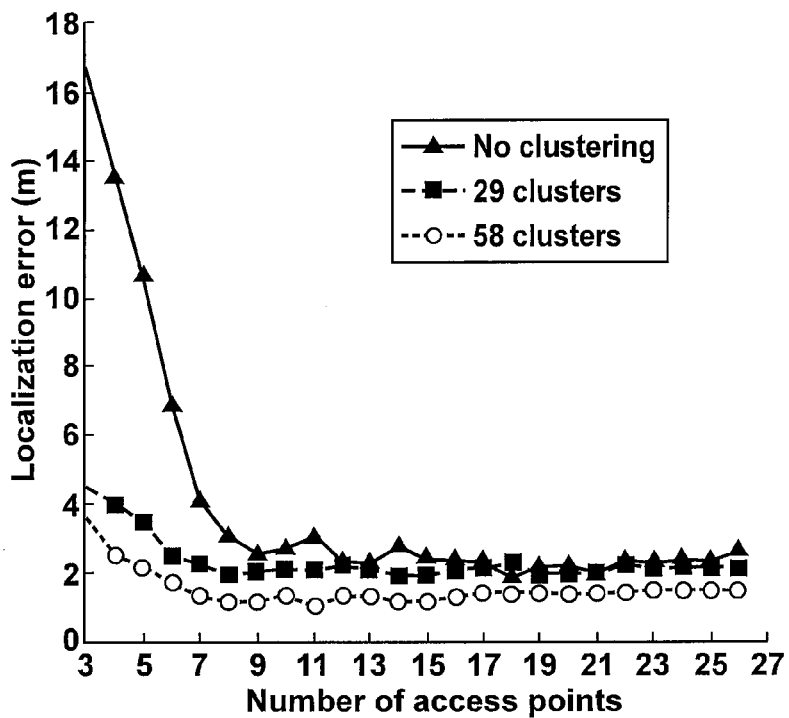
FIG. 6 illustrates the implementation result of the average localization error with respect to the number of access points used, under different number of clusters generated in all four orientations.

Since the coarse localization is used to reduce the area of interest for location estimate into a subset C, the dimension of the sparse signal in the CS algorithm is reduced to Ñ. According to the theory of compressive sensing, the location indicator can be well recovered when the number of APs is in the order of log(Ñ). This allows the system to reduce the number of APs required for accurate location recovery. FIG. 6 shows the average localization error as a function of the number of APs used in the algorithm, under different number of clusters generated by the affinity propagation. As illustrated in FIG. 6, only 8 APs are needed to achieve about 1.1 m error when a total of 58 clusters are generated in all four directions, and 1.9 m error under 29 clusters. However, 18 APs are needed to achieve 1.8 m error if no clustering scheme is applied.

Figure 7:
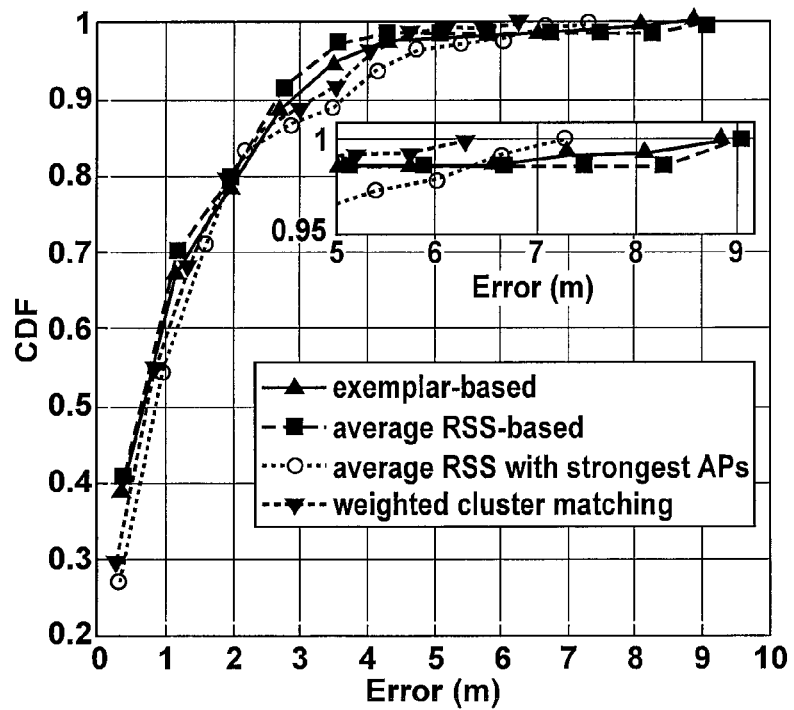
FIG. 7 illustrates the CDF of the localization error of the positioning system under different coarse localization schemes, when 10 APs are used.

Furthermore, the number of clusters generated by the affinity propagation is determined by the input of preference value, which is experimentally set. In one hand, increasing the number of clusters helps to reduce the area of interest into a smaller region after the coarse localization and thus, improves the average localization accuracy and also reduces the complexity for the fine localization. On the other hand, this increases the chance of choosing the wrong cluster, which induces a large localization error of the positioning system. Therefore, we studied different coarse localization schemes to reduce the possibility of choosing the wrong cluster. FIG. 7 illustrates the Cumulative Distribution Function (CDF) of the localization error under different coarse localization schemes described above, when 10 APs are used. It is shown that the weighted cluster matching scheme reduces the maximum localization error from 9.2 m to 6.3 m over the experiments, as it takes into account the stabilities of the RSS readings from different APs.

Figure 8:
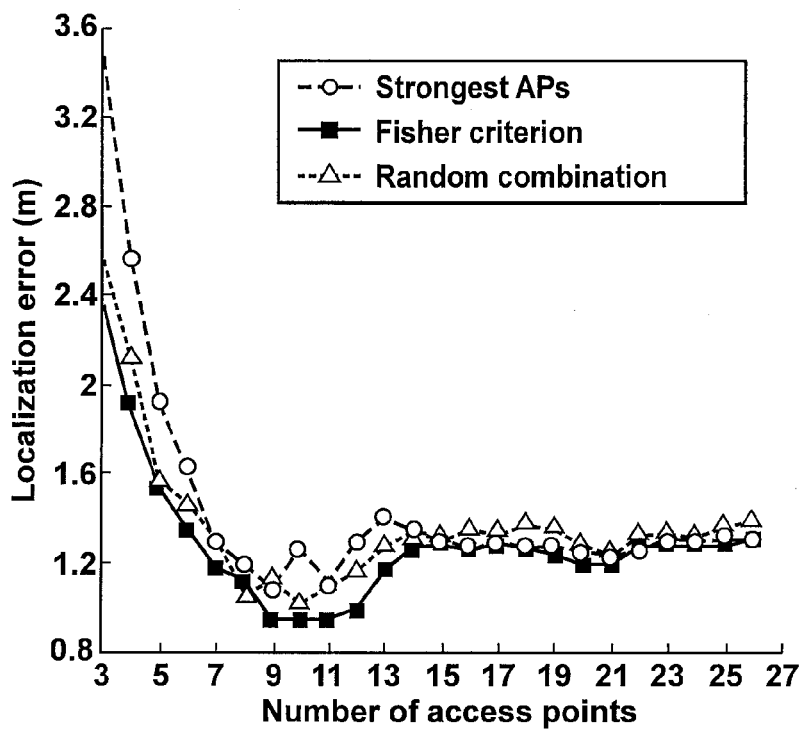
FIG. 8 illustrates the implementation result of the average localization error under different AP selection schemes.

FIG. 8 shows the average localization error under different AP selection schemes for the fine localization. In the random combination scheme, according to (19), the value of x-axis implies the number of linear random combinations of online RSS values from the L APs. Among the three schemes proposed, AP selection using the Fisher criterion achieves the best performance especially when the number of APs is less than 5, while the strongest APs selection achieves the worst performance. The proposed random selection scheme achieves a localization error comparable to that of the Fisher criterion, but does not require a large number of offline RSS time samples to calculate the variance. In addition, the matrix Φ can be reused for each location update, saving the computational time for the fine localization.

Meanwhile, using more APs for the fine localization may not necessarily increase the accuracy due to the biased estimation that is generated by unstable APs. As shown in FIG. 8, when the number of APs is above 11, the performance of the positioning system decreases. It is not affected by the way we choose the APs, as redundant APs are introduced for all of the three cases.

Figure 9:
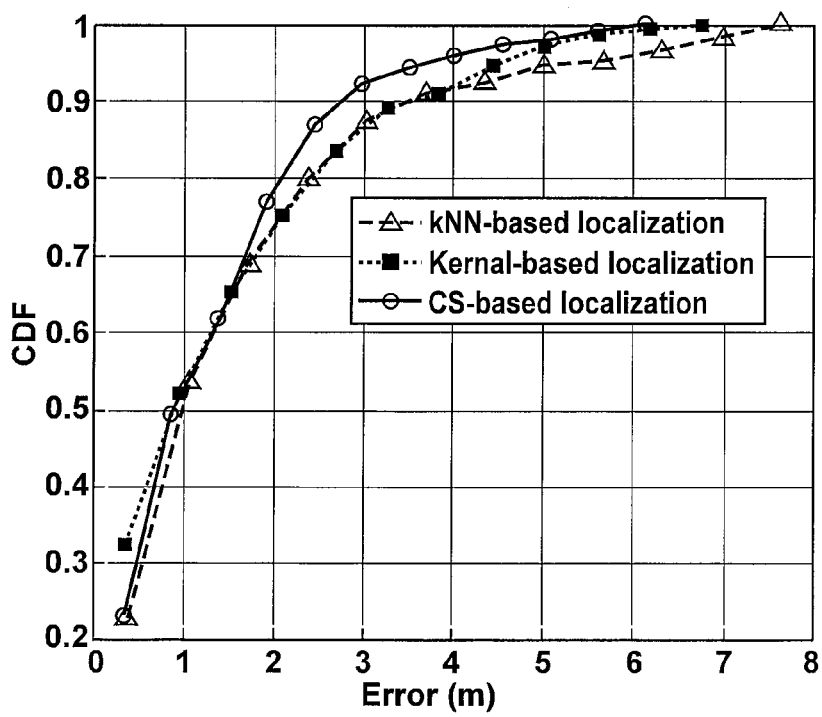
FIG. 9 illustrates the cumulative error distribution for kernel-based method, kNN, and the proposed CS-based method.

We compare the localization system of the present invention with the traditional fingerprinting approaches, known as the kNN and the kernel-based methods, in terms of the cumulative error distribution, when 10 APs are used. The proposed positioning system used affinity propagation to generate overall 58 clusters at four orientations during the offline phase, and then performed coarse localization by weighted cluster matching, followed by a fine localization stage consisting of a random AP combination, an $l_1$-minimization algorithm and a post-processing procedure. For fairness, the three positioning systems use the same coarse localization scheme, but are different in the fine localization stage. FIG. 9 shows the implementation result. As noticed, with 90% of the time, the proposed CS-based method achieves an error within 2.7 m, and outperforms the kNN and the kernel-based method by 25% and 28%, respectively.

In order to reduce the number of reference points for the fingerprinting approach, the same CS scheme is also used in the offline phase to reconstruct the radio map based on RSS measurements at only a small number of reference points. In the simulation, only 36 of the reference points are randomly picked, and we show that the radio map at the overall 72 reference points can be well recovered compared with the values we actually measured at these 72 reference points.

Figure 10:
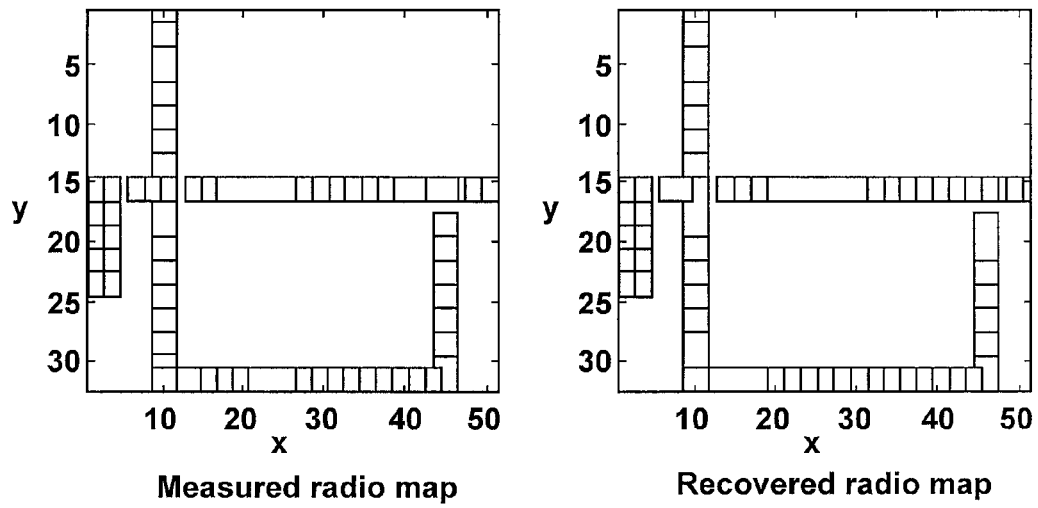
FIG. 10 illustrates recovery of the radio map during the offline phase using the theory of compressive sensing.

FIG. 10*a* shows an example of the actual measured RSS radio map from AP 1 at 72 reference points over the experimental area, while FIG. 10*b* is the corresponding reconstructed radio map, based on samples from 36 randomly picked FPs using the same PDA. The same technique is used for recovering RSS readings from the rest of APs.

Figure 11:
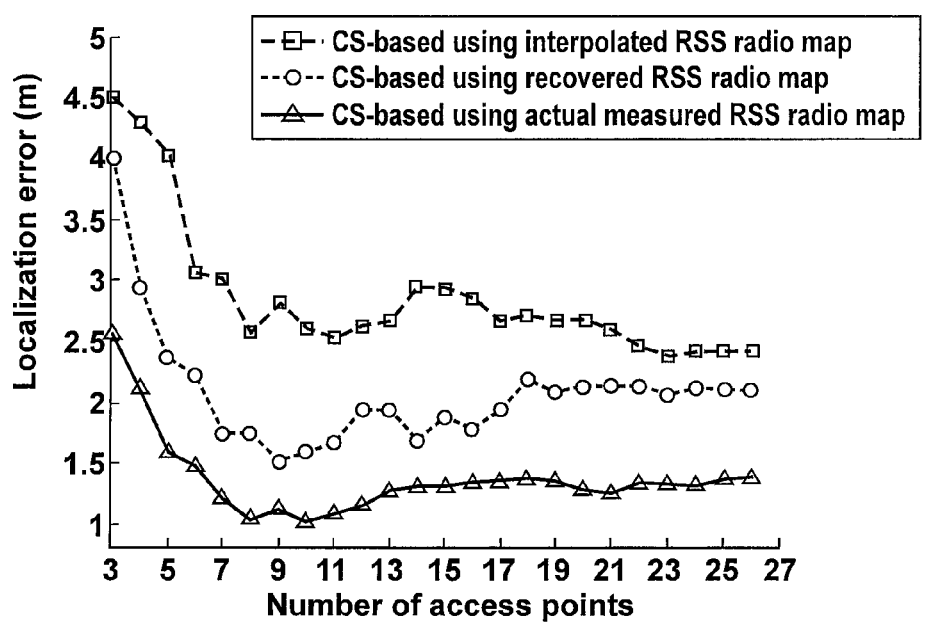
FIG. 11 illustrates a comparison of the localization accuracy, using actual RSS measurements at 72 reference points, the recovered RSS radio map from samples on 36 reference points, and that using interpolated RSS radio map.

We further use all the reconstructed RSS radio map for localization, compared with the localization using the actual measured radio map. FIG. 11 shows that the proposed scheme is able to achieve an average error of 1.6 m by using the reconstructed radio map, when 10 APs are used. However, using the radio map recovered by the traditional interpolation approach reduces the average localization error to 2.6 m, when 10 APs are used.

EXPERIMENT #2

Figure 12:
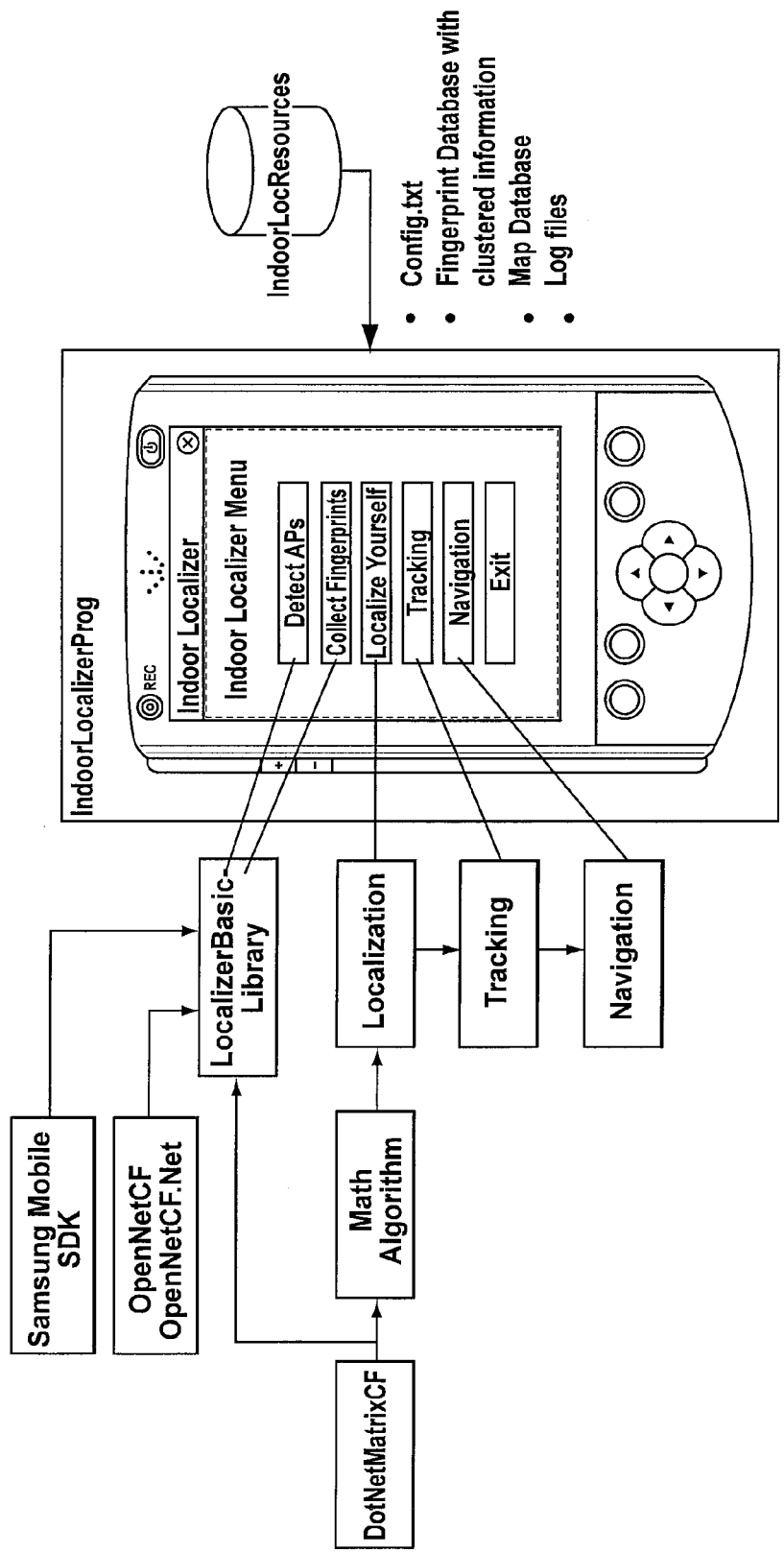
FIG. 12 illustrates a modular overview for implementing the computer program of the present invention.

A software application is developed on smart devices installed with Windows Mobile platform to implement the proposed indoor tracking and navigation system. The software is developed in C# using Microsoft .Net Compact Framework version 3.5. In addition, two open source library: OpenNetCF and DotNetMatrix are used to provide the RSS scanning function and matrix operations to the program. The software is tested on a PDA manufactured by HP, hp iPAQ hx2750. The overview of our software is illustrated in FIG. 12.

The localization system with prediction is tested at the second floor of the Canadian National Institute for the Blind (CNIB) with an area dimensions of 18 m×36 m. During the offline phase, we have run the developed software on the PDA to collect 100 RSS time samples for each of four orientations:

North, East, South and West (with the sampling rate of 1 sample per second) over 128 reference points (N=128) which are evenly distributed on the site with an average grid spacing of 1.5 m. In this experiments, about 15 clusters are generated for each orientation RSS database, such that the reference points within the same cluster are geographically close to each other and only 2 or 3 outliers are required to be modified.

Several traces are collected to evaluate the performance of the localization system with prediction. We have walked at a constant speed along 4 different traces, which are summarized in Table I and collected the RSS readings from visible APs using the same PDA at 1 sample per seconds.

TABLE I

TRACES SUMMARY

| Trace # | # of turns | # Repetitions | Distance | Average Duration |
|---|---|---|---|---|
| 1 | 2 | 4 | 53.63 m | 156.3 s |
| 2 | 2 | 4 | 29.43 m | 89.2 s |
| 3 | 0 | 4 | 30.80 m | 84.6 s |
| 4 | 4 | 2 | 91.84 m | 279.5 s |

Figure 13:
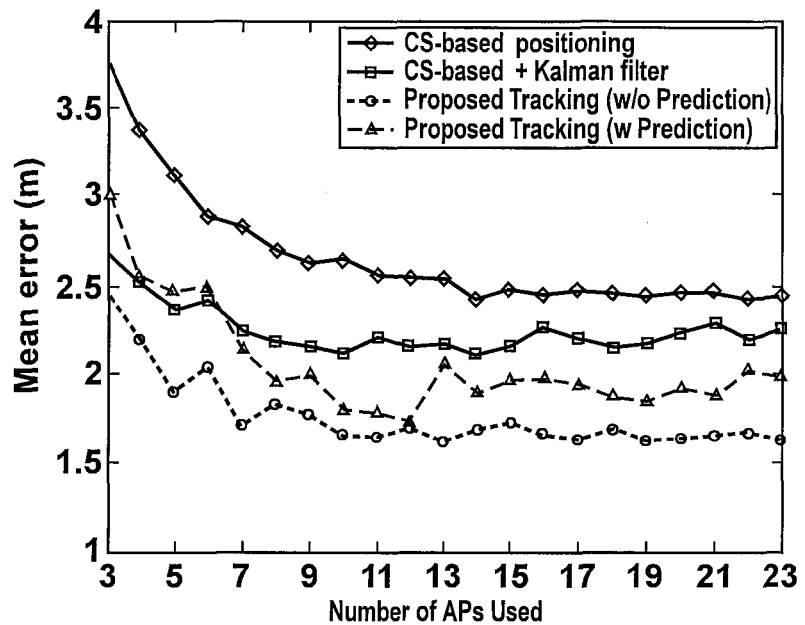
FIG. 13 illustrates a comparison of localization accuracy of a mobile user for different positioning and tracking schemes.

FIG. 13, for example, compares four different versions of the localization system. In the scheme called "CS-based Positioning", we only use the estimated location of the user. In the "CS-based+Kalman filter", we input the location estimates obtained by the localizer into a Kalman filter to further refine the location estimates. The localization system is also used in two versions: without prediction and with linear prediction. The details of these versions are discussed above.

The mean errors of these systems remain around the same once the number of APs used are beyond 10 and reflect the property of the CS theory that a minimum bound is required. The localization system with prediction using either scheme is able to improve the non-prediction localization system and also achieve better accuracy than by directly applying the Kalman filter. When 10 APs are used, the localization system using the unpredicted scheme leads to the average error improvement of 0.98 m (37%) and 0.45 m (21%) over that of the non-prediction localization system and the Kalman filter respectively.

Figure 14:
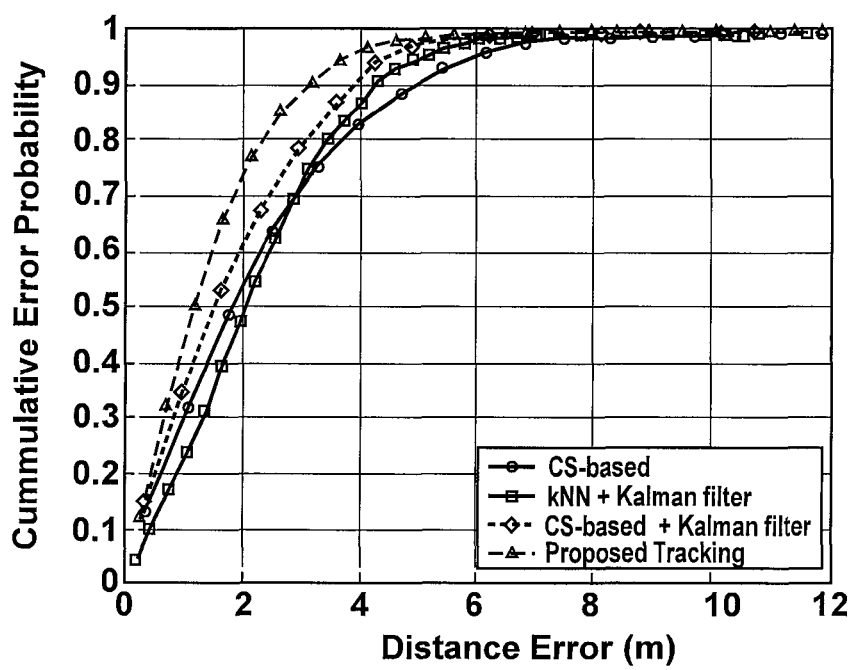
FIG. 14 illustrates cumulative error probability using 10 APs.

This tracking system with the unpredicted scheme is compared with the non-prediction localization system and the direct applications of the Kalman filter on both the KNN method and the non-prediction localization system. FIG. 14 shows the comparison results in terms of cumulative error distributions and Table II shows the position error statistics for these four systems. The localization system outperforms the other three methods, as it has the smallest mean error, 90th percentile error and variance when compared to the other systems.

TABLE II

POSITION ERROR STATISTICS

| Method | Mean [m] | $90^{th}$ [m] | Max [m] | Var [m^2] |
|---|---|---|---|---|
| CS-based + Positioning Positioning | 2.68 | 5.26 | 26.64 | 4.79 |
| KNN + Kalman Fileter | 2.41 | 4..41 | 10.95 | 2.42 |
| CS-based + Kalman Filter | 2.17 | 4.15 | 24.10 | 2.69 |
| Proposed Tracking | 1.74 | 3.36 | 17.93 | 1.91 |

Figure 15:
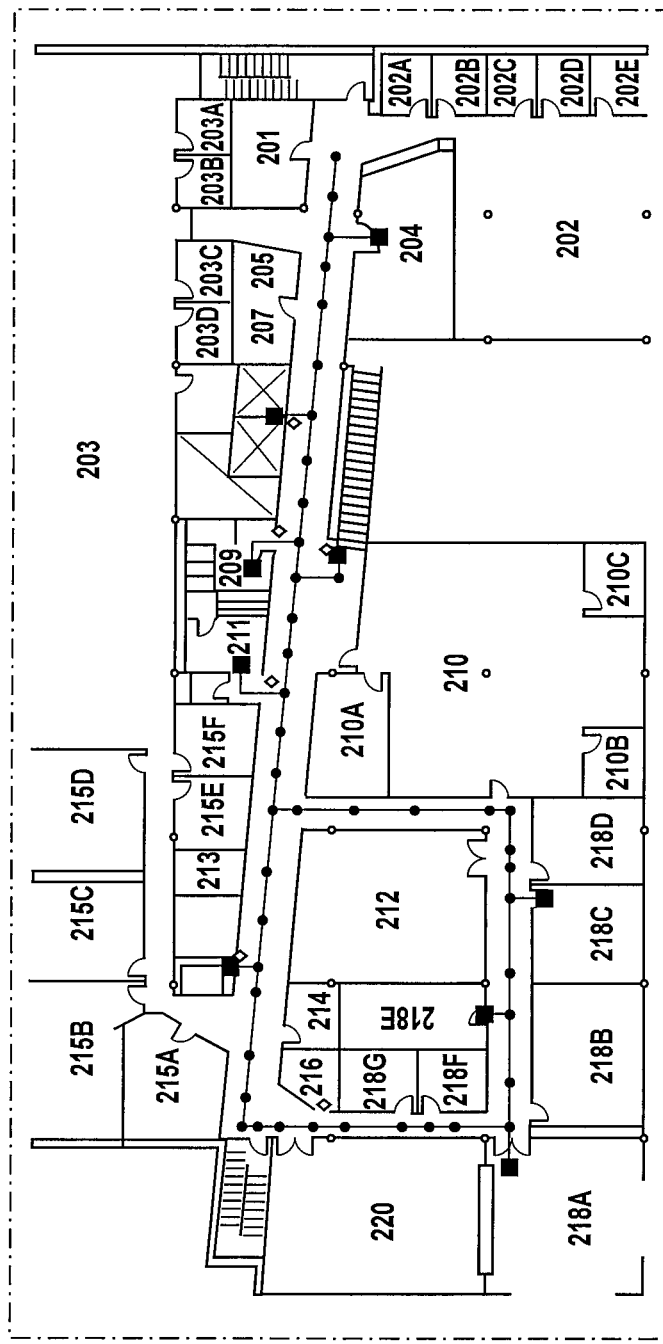
FIG. 15 illustrates the connected graph defined in CNIB to be used for path routing.

We have tested the navigation module on the same experimental site using our developed software on the PDA. FIG. 15 shows the map with the proper defined nodes, which are used by the navigation module to generate path to the desired destination and give appropriate guidance to the user.

Figure 16:
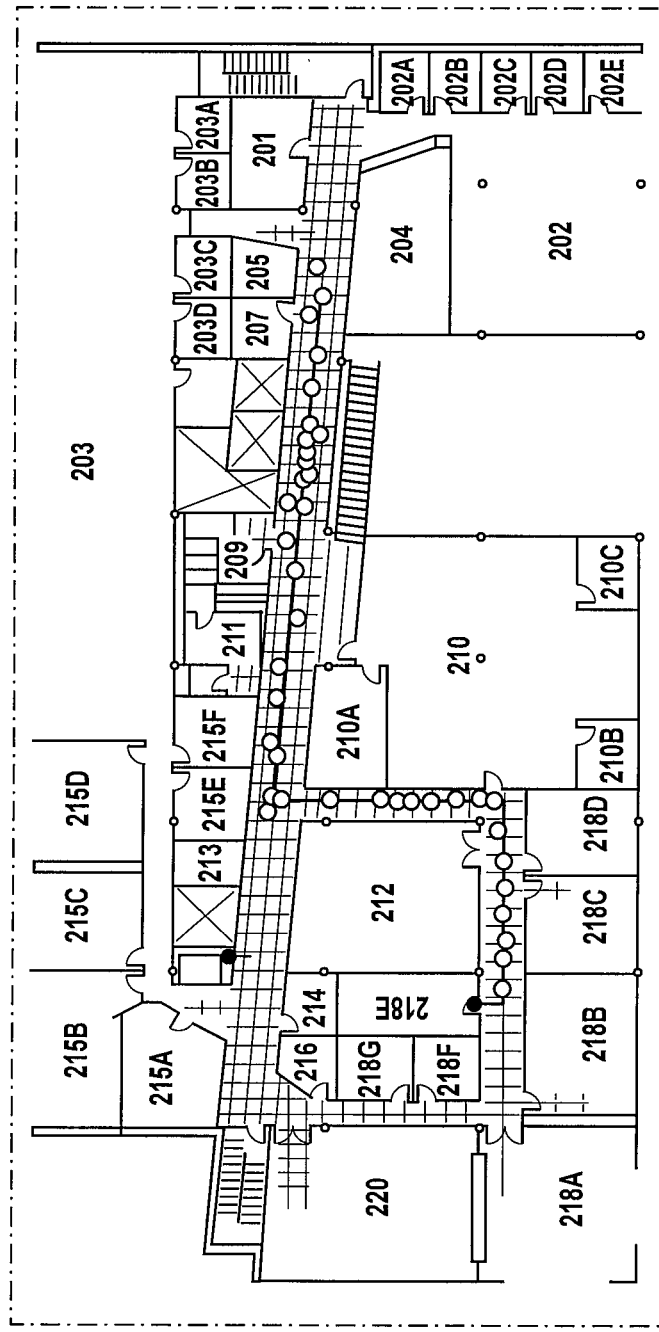
FIG. 16 illustrates a screenshot of the computer program of the present invention showing the actual tracks that the user is walking. The line shows the routed path generated by the navigation module. The squares denote the user's locations and the circle denotes the destination.

The navigation starts by first asking the user to choose the desired destination on the PDA, then the software finds the user's location and runs the Dijsktra shortest path algorithm on the predefined connected graph to generate the walking path. Then, the system starts our proposed tracking system, which updates the user's current position every 2 seconds (using 2 RSS time samples for each update). An example screenshot is illustrated in FIG. 16 where the user starts from Room 207 on the map and walks towards Room 218E.

We have asked several visually impaired people to try our navigation device on this experimental site. It is clear that the device is able to provide useful guidance to the user to reach his desired destination, as it is able to generate relevant instructions according to the user's locations. In particular, the device is able to lead the participants to reach the spring water fountain, a small, wall-mounted object that is often easily missed by the participants.

The foregoing description of embodiments has been presented for purposes of illustration and description. It is not intended to be exhaustive or to be limited to the precise forms disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto and their equivalents.

We claim:

1. A mobile device comprising a processor and a non-transitory computer-readable medium storing a set of instructions, the processor when executing the set of instructions causes the mobile device to:
   wirelessly receive and measure a Received Signal Strength (RSS) of at least one signal emitted from each network access point in a subset of a plurality of network access points;
   determine a reduced area of a geographic area within which a location of the mobile device is likely to be by using:
   a radio map, stored in the mobile device, defining the geographic area by a plurality of reference points each characterized by the RSS of signals that are emitted from the plurality of network access points; and
   the measured RSS of the at least one signal emitted from each said network access point in the subset of the plurality of network access points;
   and
   determine the location of the mobile device based on:
   the determined reduced area; and
   compressive sensing applied to a set of RSS measurements selected from the group consisting of the measured RSS of the at least one signal emitted from each said network access point in the subset of the plurality of network access points;
   wherein the determined reduced area is determined by using a cluster matching algorithm or a tracking algorithm.

2. The mobile device of claim 1, wherein the tracking algorithm uses an estimate of the location of the mobile device based on past history.

3. The mobile device of claim 1, wherein determining the location of the mobile device is based on one or more past determinations of a past location of the mobile device.

4. The mobile device of claim 1, wherein determining the location of the mobile device is based on motion dynamics of the mobile device.

5. The mobile device of claim 4, wherein the motion dynamics are modeled by a Bayesian tracking model and a filter.

6. The mobile device of claim 5, wherein the filter is a modified Kalman filter whose updating rules are governed by map information.

7. The mobile device of claim 1, wherein the mobile device is linked to a navigation module enabling a user of the mobile device to obtain path routing and tracking updates based on a desired destination.

8. The mobile device of claim 1, wherein each said determination by the mobile device applies one or more schemes for compensating for dynamic radio channel characteristics.

9. The mobile device of as defined in claim 1, wherein the mobile device determines the location of the mobile device without a location of any said network access point.

10. The mobile device of as defined in claim 1, wherein the mobile device determines the location of the mobile device without transmitting the location of the mobile device.

11. The mobile device of as defined in claim 10, wherein the mobile device determines the location of the mobile device without transmitting information sufficient to identify the location of the mobile device, whereby the location of the mobile device is determined anonymously.

12. The mobile device of as defined in claim 1, wherein each said reference point is further characterized by the RSS of signals that are received from a plurality of directions.

13. A method implemented by a plurality of network access points and a mobile device comprising a processor and a non-transitory computer-readable medium the method comprising:
    wirelessly receiving a radio map defining a geographic area by a plurality of reference points each characterized by the received signal strength (RSS) of signals that are emitted from the plurality of network access points;
    wirelessly receiving and measuring the RSS of at least one signal emitted from each said access point in a subset of the plurality of network access points;
    determining a reduced area of the geographic area within which a location of the mobile device is likely to be by using:
        the received radio map; and
        the measured RSS of the at least one signal emitted from each said network access point in the subset of the plurality of network access points;
    and
    determining the location of the mobile device based on:
        the determined reduced area; and
        compressive sensing applied to a set of RSS measurements selected from the group consisting of the measured RSS of the at least one signal emitted from each said network access point in the subset of the plurality of network access points;
    wherein the determined reduced area is determined by using a cluster matching algorithm or a tracking algorithm.

14. The method of claim 13, wherein the tracking algorithm uses an estimate of the location of the mobile device hardware based on past history.

15. The method of claim 13, wherein determining of the location of the mobile device is based on one or more past determinations of a past location of the mobile device.

16. The method of claim 13, wherein determining the location of the mobile device is further based on motion dynamics of the mobile device.

17. The method of claim 16, wherein the motion dynamics are modeled by a Bayesian tracking model and a filter.

18. The method of claim 17, wherein the filter is a modified Kalman filter whose updating rules are governed by map information.

19. The method of claim 13, wherein the mobile device is linked to a navigation module enabling a user of the mobile device to obtain path routing and tracking updates based on a desired destination.

20. The method of claim 13, comprising applying one or more schemes for compensating for dynamic radio channel characteristics.

21. The method of claim 13, wherein the location of the mobile device is determined without using of a location of any said network access point.

22. The method of claim 13, wherein the location of the mobile device is determined without transmitting the location of the mobile device.

23. The method of claim 13, wherein the location of the mobile device is determined without transmitting information sufficient to identify the location of the mobile device, whereby the location of the mobile device is determined anonymously.

24. The method of claim 13, wherein each said reference point is further characterized by the RSS of signals that are received from a plurality of directions.

25. A non-transitory computer readable medium comprising software executable by hardware to perform the method of claim 13.

26. A method implemented by a plurality of network access points and mobile device comprising a processor and a non-transitory computer-readable medium, the method comprising:
    wirelessly receiving, and measuring a received signal strength (RSS) of, a signal emitted from each access point in a subset of the plurality of network access points;
    determining a portion of a geographic area in which the mobile device is located by using:
        a radio map, stored in the mobile device, defining the geographic area by a plurality of reference points each characterized by the RSS of signals that are emitted from the plurality of network access points; and
        the measured RSS of the signal emitted from each said network access point in the subset of the plurality of network access points;
    and
    determining the location of the mobile device from:
        the determined portion of the geographic area; and
        compressive sensing with the measured RSS of the signal emitted from each said network access point in the subset of the plurality of network access points, wherein the determining of the location of the mobile device hardware is without the location of any said network access point;
    wherein the determined portion of the geographic area is determined by using a cluster matching algorithm or a tracking algorithm.

27. A non-transitory computer readable medium comprising software executable by hardware to perform the method of claim 26.

* * * * *